United States Patent Office 3,460,982
Patented Aug. 12, 1969

3,460,982
BIAXIALLY ORIENTED POLYESTER FILM BASE HAVING A SUBLAYER OF AN ALKYL ACRYLATE/DIALLYL PHTHALATE/ITACONIC ACID
Arthur Appelbaum, Highland Park, N.J., assignor to E. I. du Pont de Nemours and Company, Wilmington, Del., a corporation of Delaware
No Drawing. Filed Jan. 3, 1966, Ser. No. 517,895
Int. Cl. B44d 1/22; C08d 13/24; C09d 3/36
U.S. Cl. 117—138.8   5 Claims

ABSTRACT OF THE DISCLOSURE

A film base suitable for photographic and drafting films comprising a biaxially oriented polyester film 0.0005–0.008 inch in thickness coated on at least one surface with a layer of a tricomponent copolymer of (i) methyl or ethyl acrylate, (ii) diallyl phthalate or divinylbenzene, and (iii) itaconic acid in the percentages 70–95, 3–28, and 2–20 respectively.

---

This invention relates to hydrophobic polyester film base having a layer or layers of a novel tricomponent addition copolymer.

Oriented polyester film base, e.g., polyethylene terephthalate, has hydrophobic surfaces which do not adhere well to hydrophilic colloid coatings.

In Alles et al. U.S. Patents 2,627,088 and 2,698,240 it is taught that aqueous dispersions of tricomponent vinylidene chloride copolymers when applied to unoriented polyethylene terephthalate films have excellent adherence to the polyester surface after biaxial orientation and to organic colloid including colloid silver halide emulsion layers coated thereon. The adherence of the tricomponent copolymers to the surface of oriented polyethylene terephthalate, however, is markedly less.

It has been found that unoriented and oriented hydrophobic polyester films can be provided with a tricomponent copolymer anchor layer by applying to one or both surfaces of the films an aqueous solution of a tricomponent copolymer comprising, by weight:

|   | Percent |
|---|---|
| (1) Methyl or ethyl acrylate | 70–95 |
| (2) Diallyl phthalate or divinylbenzene | 3–28 |
| (3) Itaconic acid | 2–20 |

The resulting coated films constitute novel and commercially useful photographic film base and can be used to make photographic films, drafting films and related films where there is good and commercially acceptable wet and dry anchorage or adherence of the tricomponent copolymer layer to the polyester base and to layers coated thereon, especially water-permeable colloid layers, e.g., gelatin and gelatin-containing silver halide layers.

The novel photographic film base of the invention comprises:

(1) a biaxially oriented film having a thickness of 0.0005 to 0.008 inch essentially composed of a highly polymeric polyester of:
(a) at least one dihydric alcohol of the formula $HOCH_2-W-CH_2OH$ where W is methylene, polymethylene or alkyl-substituted polymethylene of 2–8 carbons, or cycoalkylene or 5–6 carbon atoms or a single bond (thus forming ethylene glycol), with
(b) an aromatic dicarboxylic acid or an ester-forming derivative thereof of which at least 15 mole percent is terephthalic acid or an ester forming derivative, and
(2) on at least one surface of (1) a layer of copolymer of (i) methyl or ethyl acrylate, (ii) diallyl phthalate, and (iii) itaconic acid in the respective percentages by weight of 70–95, 3–28 and 2–20.

The diallyl phthalate component may be diallyl orthophthalate, diallyl isophthalate or diallyl terephthalate.

Any of the specific dihydric alcohols and dicarboxylic acids or ester-forming derivatives disclosed in Cohen et al. U.S. Patent 3,035,881 including the dibasic, aliphatic components can be used in making the polyesters referred to in the preceding statement of the invention.

The tricomponent copolymer and aqueous coating compositions can be made by admixing the components with water, an addition polymerization initiator and a surfactant and inducing polymerization by known procedures including those disclosed in the Alles et al. patents listed above.

The polymer latex is coated onto the biaxially oriented polyester film by conventional coating methods including dip or skim coating, or by means of transfer rollers. The coating can be dried at 60°–150° C. The initial pH of the coating solution can be about 3. It can be adjusted, e.g., by addition of concentrated ammonia, before coating onto the oriented film. Adhesion with a single sub system is greatly improved when the aqueous emulsion is applied to a polyester base which has been treated with electrical discharge, flame, by surface oxidation, ultraviolet light exposure, or the acid treatment disclosed in Cohen et al. 3,035,881.

Werner-type chromium complexes can be added to the coating compositions to improve bonding. Suitable complexes are those disclosed in U.S. Patents 2,544,667 and 2,549,220.

The coating compositions, moreover, may contain various pigments for tinting, opacifying or other purposes, e.g., carbon black, barium sulfate, titanium dioxide, zinc oxide, magnesium oxide, silicon dioxide; phthalocyanine dyes or organic dyes, e.g., Fuchsine (C.I. 42510), Auramine Base (C.I. 41000B), Calcocid Green S (C.I. 44090), Para Magenta (C.I. 42500), Tryparosan (C.I. 42505), New Magenta (C.I. 42690), Nile Blue 2B (C.I. 51185), New Methylene Blue GG (C.I. 51195), C.I. Basic Blue 20 (C.I. 42585), Night Green B (C.I. 42115), C.I. Direct Yellow 9 (C.I. 19540), C.I. Acid Yellows 17 (C.I. 18965), Tartrazine (C.I. 19140), and Fast Black L (C.I. 51215), and Ethyl Violet (C.I. 42600).

The invention will now be illustrated, but is not intended to be limited by the following procedures and examples.

PROCEDURE A

A subbing composition comprising methyl acrylate, diallyl phthalate and itaconic acid was prepared as follows: The following were placed in a suitable vessel:

| | Parts by weight |
|---|---|
| Methyl acrylate | 94 |
| Diallyl phthalate | 10 |
| Itaconic acid | 6 |
| 30% by weight sodium lauryl sulfate in water | 15 |
| Water | 280 |

The mixture was stirred and purged with nitrogen in a vessel provided with a reflux condenser for about 15 minutes. The temperature of the reaction mixture was raised to 75° C., and 0.5 part per weight of ammonium persulfate dissolved in 10 parts by weight water was added. The milky white, almost colorless solution immediately became translucent upon the addition of ammonium persulfate and the temperature in the flask rose to 80° C. The reaction temperature was maintained at between 70° and 80° C. for 1 hour. The emulsion was filtered and a milky white aqueous dispersion was obtained.

PROCEDURE B

The composition was made in a manner similar to the composition of Procedure A except 4 parts by weight 30% sodium lauryl sulfate in water and 1.0 part ammonium persulfate was used. A milky white, aqueous dispersion was obtained.

PROCEDURE C

The composition was made in a manner similar to the composition of Procedure A except 15 parts by weight of diallyl phthalate was used, and 85 parts by weight of ethyl acrylate was used in place of the methylacrylate. A milky white, aqueous dispersion was obtained.

PROCEDURE D

The composition was made in a manner similar to the composition of Procedure A except 5 parts by weight of diallyl phthalate was used, and 95 parts by weight of ethyl acrylate was used in place of the methyl acrylate. A milky white, aqueous dispersion was obtained.

PROCEDURE E

The composition was made in a manner similar to the composition of Procedure A except 10 parts by weight of diallyl terephthalate was used in place of the diallylphthalate. A milky white, aqueous dispersion was obtained.

PROCEDURE F

The composition was made in a manner similar to the composition of Procedure A except 10 parts by weight of diallyl isophthalate was used in place of the diallyl phthalate. A milky white, aqueous dispersion was obtained.

PROCEDURE G

The composition was made in a manner similar to the composition of Procedure A except 4 parts by weight 30% sodium lauryl sulfate in water was used, 1 part by weight of $(NH_4)_2S_2O_8$ was added, and 5 parts by weight of divinylbenzene was used in place of the diallyl phthalate. A milky white, aqueous dispersion was obtained.

PROCEDURE H

The composition was made in a manner similar to the composition of Procedure G except 10 parts by weight of divinylbenzene was used. A milky white, aqueous dispersion was obtained.

Example I

Polyethylene terephthalate films were cast and biaxially stretched about 3 times in unit length and width at a temperature of about 88° C. to provide a final thickness of about 0.004- and 0.007-inch respectively, and then heatset after the manner described in Example I of Alles, U.S. Patent 2,799,684.

Material prepared as described in Procedure A was diluted with distilled water to a concentration of 3-5% by weight solids. The resulting aqueous dispersion was then used to coat one side of each of the biaxially oriented polyethylene terephthalate films. Coating was accomplished by the air knife technique; the polymer coating mixture temperature was 95° F. The coated films were dried at 100° C. and heat relaxed for 2 min. at 150° C. A gelatino-silver halide photographic emulsion of the lithographic type was then coated on each of the polymer coated surfaces. The emulsion comprised 52 mg. gelatin per 82 mg. silver halide (30 mole percent AgBr and 70 mole percent AgCl) and hardening restrainers such as 2,4-dihydrobenzaldehyde and polyhydroxybenzene after the manner described in Example I of Harriman, U.S. Patent 2,591,542.

The films were found to have satisfactory wet anchorage when tested by exposing samples to white light, processing in a standard lithographic developer of the hydroquinone-paraformaldehyde type, fixing, and after washing, but before drying, scribing two lines 2 inches long and ½ inch apart through the emulsion layer with a phonograph needle and rubbing across the marks with a rubber squeegee. The coating showed no tendency to peel from the base. The test for dry anchorage was made by taking a sample film, coated as above, exposing it to white light, and processing as described above. The processed and dried sample was then scored with a phonograph needle to produce four parallel scratches through the emulsion layer ¼ inch apart. A series of lines was then scored across these lines at an angle of about 60° to them and about ¼ inch apart to produce 3 lines of 9 rhomboid figures scratched through the emulsion layer. A piece of transparent pressure-sensitive, adhesive tape was then pressed down over the scored area and a loose end of the tape grasped at about a 90° angle to the film surface. The tape was pulled up briskly and an arbitrary measure of adhesion obtained by comparing each group of 10 samples with a graded series of standards prepared with films having excellent to very poor anchorage. The arbitrary scale ranges from a value of 0 for excellent anchorage to 10 for very poor anchorage. Tested in this manner, the samples of experimental film were rated from 4 to 5 on the arbitrary scale, which indicated good anchorage.

Example II

Films were made in a manner similar to the films of Example I, except the polymer subbing dispersion, prepared as in Procedure A, was adjusted to 8.5% by weight polymer solids. When tested as described in Example I, the results were equivalent to those obtained in Example I.

Example III

A series of films was prepared similar to the films of Examples I and II in which the polymer subbing compositions were the materials prepared as described in Procedures B, C, D, E, F, G, and H. Tested in the manner of Example I, the samples having methyl acrylate in the subbing layer rated 4 to 5 for dry adhesion on the arbitrary scale, which was good; wet adhesion was also good. The samples having ethyl acrylate in the subbing layer rated 5 to 7 for dry adhesion, which was good to fair; wet adhesion was good.

Example IV

Sample films were made in a manner similar to the films of Examples I, II, and III except the pH of the coating mixture was adjusted to 4-5 with $NH_4OH$ and a Werner type chromium complex such as disclosed in U.S. Patents 2,544,667 and 2,549,220, was added to the aqueous sub prior to coating.

Addition of the Werner type methacrylic acid complex of chromium chloride in isopropanol resulted in improvement in the wet adhesion; dry adhesion was improved by at least 1 unit on the arbitrary scale over similar films with no chromium complex added to the aqueous sub.

Example V

A series of films was made as described in Example IV, except that the p-aminobenzoic acid chromium chloride complex was added to the aqueous sub in place of the methacrylic acid chromium chloride complex. The results were equivalent to those obtained in Example IV.

Other Werner type chromium complexes have been used such as hydroxyacetic acid complex, trichloroacetic acid complex, pyromellitic acid complex, and myristic acid complex; see also, Goebel et al., U.S. Patent 3,544,667. The amount of chromium complex was varied from 0.03% to 0.50% of the coating mixture by weight. The results were equivalent to those obtained in Example IV.

Example VI

A series of films was made as described in Example IV, except that one part of the sodium salt of lauryl alcohol sulfate per 100 parts of 5% solids mixture was used in addition to the chromium complex. There was no adjustment of the pH of the coating mixture prior to the addition of the chromium complex. The results were equivalent to those obtained in Example IV.

Example VII

Polyethylene terephthalate film was cast and biaxially stretched after the manner described in Example I. The surface of the film was then treated with electrical discharge after the manner described in Travers, U.S. Patent 3,113,208. A 45-inch wide, .004-inch thick web of the stretched film was drawn past the discharge rods, and .030 inch from the rods. The rods were charged by a high voltage generator at 1.4 amps. and 1100 watts and 10,000 volts. A 45-inch wide .007-inch web of the stretched film is drawn past the discharge and in a similar manner. The films were then coated with any of the above subbing mixtures in a manner similar to Examples I, II, III, IV, V, and VI. When tested as described in Example I, the films subjected to electrical discharge treatment showed improvement in dry adhesion by 1 to 2 units on the arbitrary scale over similar films with no electrical discharge treatment prior to coating. Wet adhesion was excellent.

Representative values for adhesion using this procedure are as follows: methyl acrylate/diallyl phthalate/itaconic acid (94/10/6) polymer diluted to 5% solids, adjusted to pH 5, and 0.05% by weight methacrylic acid complex of chromium chloride gave dry adhesion of 0–1, which was excellent.

Example VIII

A series of films was made as described in Example VII, except that the surface of the film was subjected to flame treatment after the manner described in Bryan, U.S. Patent 3,145,242, rather than subjected to electrical discharge.

The surface of a polyethylene terephthalate film was treated with an air-propane flame and then coated with an ethyl acrylate/diallyl phthalate/itaconic acid (90/10/10) polymer diluted to 6% solids. There were no additives to the subbing solution. Tested in the manner of Example I, the results were equivalent to those obtained in Example VII.

Care should be taken to avoid processing with formaldehyde photographic films made from the coated film base of the invention.

Formaldehyde destroys wet anchorage when in contact with the sub layer. If formaldehyde is present, a substance should be placed in the film, etc. to nullify or slow down the effect of the formaldehyde, after the manner described in Harriman, U.S. Patent 2,591,542.

The photographic film base of this invention can be coated with any of the specific colloid solutions or emulsions described in Cohen et al. 3,035,881 or with compositions as described in Van Stappen U.S. Patent 2,964,423.

The embodiments of the invention in which an exclusive property or privilege is claimed are defined as follows:

1. A film base comprising:
   (1) a biaxially oriented film having a thickness of 0.0005 to 0.008 inch essentially composed of a highly polymeric polyester of:
      (a) at least one dihydric alcohol of the formula $HOCH_2$—W—$CH_2OH$ where W is methylene, polymethylene or alkyl-substituted polymethylene of 2–8 carbons, or cycloalkylene of 5–6 carbon atoms, or a single bond, with
      (b) an aromatic dicarboxylic acid or an ester-forming derivative thereof of which at least 15 mole percent is terephthalic acid or an ester-forming derivative, and
   (2) on at least one surface of film (1) a layer of a a tricomponent copolymer of (i) methyl or ethyl acrylate, (ii) diallyl phthalate or divinylbenzene, and (iii) itaconic acid in the respective percentages by weight of 70–95, 3–28 and 2–20.

2. A film base according to claim 1 wherein said polymeric polyester is biaxially oriented.

3. A film base according to claim 1 wherein said polymeric polyester is biaxially oriented polyethylene terephthalate.

4. A film base according to claim 1 wherein said tricomponent copolymer is a methyl acrylate/diallyl phthalate/itaconic acid copolymer.

5. A film base according to claim 1 wherein the tricomponent copolymer layer contains a Werner-type chromium complex.

References Cited
UNITED STATES PATENTS

| | | | |
|---|---|---|---|
| 2,557,189 | 6/1951 | Irany et al. | 260—78.5 |
| 2,964,423 | 12/1960 | Van Stappen | 117—138.8 X |
| 3,139,354 | 6/1964 | Wolff | 117—138.8 X |
| 3,217,066 | 11/1965 | Greenspan et al. | 117—161 X |
| 3,227,576 | 1/1966 | Van Stappen | 117—138.8 X |
| 3,245,937 | 10/1966 | Wagner | 117—138.8 X |

WILLIAM D. MARTIN, Primary Examiner

J. E. MILLER, Assistant Examiner

U.S. Cl. X.R.

96—87; 117—7, 34, 47, 161; 260—78